US012318351B2

(12) United States Patent
Jones

(10) Patent No.: US 12,318,351 B2
(45) Date of Patent: Jun. 3, 2025

(54) FACE CRADLE SYSTEM

(71) Applicant: Mark Jones, Mesa, AZ (US)

(72) Inventor: Mark Jones, Mesa, AZ (US)

( * ) Notice: Subject to any disclaimer, the term of this patent is extended or adjusted under 35 U.S.C. 154(b) by 0 days.

(21) Appl. No.: 17/366,043

(22) Filed: Jul. 2, 2021

(65) Prior Publication Data

US 2023/0000713 A1 Jan. 5, 2023

(51) Int. Cl.
*A61H 7/00* (2006.01)

(52) U.S. Cl.
CPC ..... *A61H 7/001* (2013.01); *A61H 2201/1607* (2013.01); *A61H 2201/1654* (2013.01); *A61H 2201/1676* (2013.01); *A61H 2203/0468* (2013.01); *A61H 2205/025* (2013.01)

(58) Field of Classification Search
CPC ............ A61H 7/001; A61H 2201/1607; A61H 2201/1654; A61H 2201/1676; A61H 2203/0468; A61H 2205/025
See application file for complete search history.

(56) References Cited

U.S. PATENT DOCUMENTS 5,427,436 A * 6/1995 Lloyd .................. A61G 15/125 297/409
5,970,546 A * 10/1999 Danis ................... A47C 20/026 5/636
7,761,943 B2 * 7/2010 Roleder ................. A61G 13/12 5/637
9,867,749 B2 * 1/2018 Mitchell .............. A61G 13/121
2008/0271248 A1 * 11/2008 DeLaura ............ A61G 13/0054 5/638
2010/0325802 A1 * 12/2010 Schwartz ............... A61H 37/00 5/636
2020/0306136 A1 * 10/2020 Kemp .................. A61G 13/121

* cited by examiner

*Primary Examiner* — Steven O Douglas

(74) *Attorney, Agent, or Firm* — Invention To Patent Services; Alex Hobson

(57) ABSTRACT

A face cradle system; the face cradle system includes a face cradle configured to be used in combination with a host massage therapy table. The face cradle includes an adjustable frame includes an open-ended oval shape having a first-arm extension, a second-arm extension, and an oval portion. The oval portion of the adjustable frame includes a padded forehead hammock positioned at a closed end of the oval portion. The padded forehead hammock features a sinus relief nodule which makes contact upon, and applies pressure to, an area directly above a bridge of a nose. The oval portion, the first-arm extension and the second-arm extension are connected at an adjustable pivot point. The face cradle system promotes proper alignment of the spine, relieves and prevents a user's sinus pressure while in a prone position, and overall facilitates a more beneficial massage.

15 Claims, 9 Drawing Sheets

FACE CRADLE SYSTEM

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of headrests and neck supports of existing art and more specifically relates to massage table headrests.

RELATED ART

Massage therapy is very popular. Usually, to start the massage the therapist has the patient lie face down on a massage therapy table with their face uncomfortably placed within a standard face cradle. While the massage may be beneficial, there are numerous problems with currently used face cradles, and these problems may even reduce the overall benefits of the massage. Ordinary face cradles usually have a semi-circular padding with an open area in the center. The face goes in that open area. The padding is applying direct pressure to the cheeks and sinuses of a user. This often causes sinus pressure. This sinus pressure can cause difficulty breathing, it can cause headaches, and some people feel it even causes stiffness of the neck and shoulder muscles. All of those negative effects are counter to the benefits of massage.

Another problem with traditional face cradles is they may prevent the natural alignment of the upper spine. Ordinary face cradles prevent the chin of the massage patient from moving forward, and this forward movement is needed to achieve the natural curvature of the neck. By preventing that natural curvature, proper spine alignment cannot be achieved. Without proper alignment, the muscles cannot be completely relaxed and that can lead to a rapid return of stiffness. A suitable solution is desired.

U.S. Pat. No. 5,427,436 to John T. Lloyd relates to an adjustable headrest. The described adjustable headrest includes an adjustable headrest includes a base supporting a crescent-shaped pad. The bottom side of the base is equipped with two triangular support structures, each of which includes a long arm and a short arm pivotally attached to distal and proximal junction structures, respectively, on the bottom side of the base. The other end of the arms are commonly and pivotally connected to a horizontal rod, one end of which is equipped with a cam lever capable of jointly controlling the lock and release status of two clamps, each of which is associated with one of the support structures. In each triangular support structure, one of the arms has an adjustable effective length. The cam lever is movable between a lock-position and a release-position. When the lever is in the lock position, the clamp prevents all rotational movement of both rectangular support structures about the horizontal rod, and prevents any adjustment of the effective length of the arms. The headrest support assembly allows height and angle adjustment of the headrest relative to a stationary table or chair by manipulating only a single clamp.

SUMMARY OF THE INVENTION

In view of the foregoing disadvantages inherent in the known massage table headrest art, the present disclosure provides a novel face cradle system. The general purpose of the present disclosure, which will be described subsequently in greater detail, is to provide a face cradle system.

A face cradle system is disclosed herein. The face cradle system includes a face cradle configured to be used in combination with a host massage therapy table. The face cradle includes an adjustable frame comprising an open-ended oval shape. The adjustable frame includes a first-arm extension, a second-arm extension, and an oval portion. The oval portion of the adjustable frame further comprises a handle and a padded forehead hammock positioned at a closed end of the oval portion. The padded forehead hammock features a sinus relief nodule which makes contact upon, and applies pressure to, an area directly above a bridge of a nose. By applying pressure directly above the bridge of the nose, the sinus relief nodule of the face cradle system helps prevent sinus pressure from forming. The oval portion, the first-arm extension and the second-arm extension are connected at an adjustable pivot point. The oval portion is configured to pivot in relation to the first-arm extension and the second-arm extension in order to properly align and position a neck and spine of a user. The face cradle system promotes proper alignment of the spine, relieves and prevents a user's sinus pressure while in a prone position, and overall facilitates a more beneficial massage.

A method for using a face cradle system may include the steps of: step one, providing a face cradle configured to be used in combination with a host massage therapy table; step two, inserting a first-arm extension and a second-arm extension within the host massage therapy table; step three, adjusting an angle of the face cradle; and step four, optionally removing the face cradle from the host massage therapy table.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a face cradle system, constructed and operative according to the teachings of the present disclosure.

The various embodiments of the present invention will hereinafter be described in conjunction with the appended drawings, wherein like designations denote like elements.

DETAILED DESCRIPTION

Figure 1:
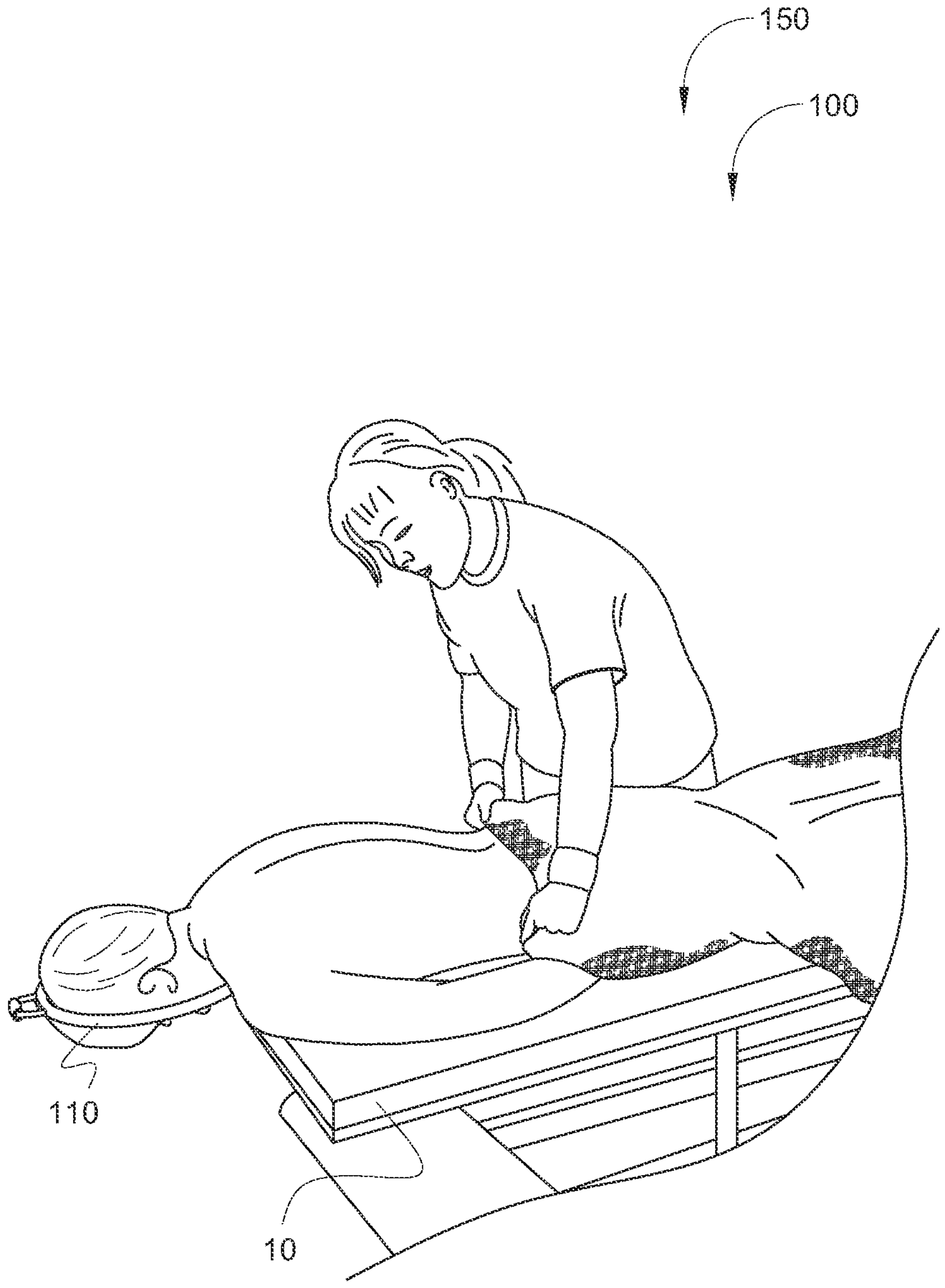
FIG. 1 is a perspective view of the face cradle system during an 'in-use' condition, according to an embodiment of the disclosure.

As discussed above, embodiments of the present disclosure relate to a massage table headrest and more particularly to a face cradle system as used to improve the comfort and proper positioning of a head, neck, and spine of a user during a massage. The face cradle system supports the head in a position of natural curvature and alignment with the neck and spine.

Generally, the face cradle system provides a novel and effective alternative to standard face cradles featured on massage therapy tables. The present face cradle system maintains a head, neck, and spine of a user in positions of natural curvature, effectively ensuring proper spinal alignment, and without need to interrupt a massage to readjust position. The face cradle system includes an adjustable frame comprising an open-ended oval shape including a first-arm extension, a second-arm extension, and an oval portion. The oval portion includes a handle and a padded forehead hammock positioned at a closed end of the oval portion. The padded forehead hammock is provided for suspending a head of a user and features a hemispherical-shaped sinus relief nodule to prevent facial and sinus pressure. The padded forehead hammock of the face cradle system does not apply pressure upon the chin or cheeks of the massage recipient, unlike standard face cradles. The padded forehead hammock allows the jaw of the massage recipient to remain in an ordinary, non-impacted position. The oval portion further includes a handle extending therefrom.

In a preferred embodiment, the adjustable frame preferably comprises an aluminum material. The oval portion extends beyond, and attaches to, the first-arm extension and second-arm extension at two adjustable pivot-points, connected by a screw and lever or other suitable pivoting mechanisms. The oval portion is of an approximate fourteen-inch (14") length and maximum ten-inch width. The oval portion of the adjustable frame may be lined with polyurethane (PU). The padded forehead hammock is filled with three (3) layers of low-resilience polyurethane foam (LRPU). Each layer of foam has a half-inch density, and with indentation force deflection rating of twelve (IFD12). The padding is encased within a tight-knit mesh lining of polyurethane (PU). The hammock is removably-attachable to the frame by a series of snap fasteners. The sinus relief nodule positioned on the padded forehead hammock may include a diameter of approximately 0.5 inches and a depth of approximately 0.5 inches.

The face cradle system may be made in variations for its application on massage tables, portable massage tables, and massage chairs. All components of the face cradle system can be made of various applicable materials that do not contain formaldehyde and carcinogens, as required by regulations of the California Air Resources Board (CARB).

A method of use may be as follows: the face cradle of the face cradle system may be attached to a host massage therapy table by insertion of a first-arm extension and a second-arm extension into axles of the host massage therapy table. A massage recipient may occupy the massage therapy table and face cradle system by laying in a face-down position. The padded forehead hammock can be adjusted in position to ensure that its sinus relief nodule contacts a point directly above a nose bridge of the massage recipient. The face cradle system will allow the massage recipient's head, neck, and spine to maintain natural curvature and proper alignment. Should the position of the face cradle system need to be adjusted in angle, a therapist may simply hold the handle, release the lever of the adjustable pivot point, and then lower or raise the adjustable frame. The therapist may then close the lever when a desired position is achieved.

Referring now more specifically to the drawings by numerals of reference, there is shown in FIGS. 1-8, various views of a face cradle system 100.

Figure 2:
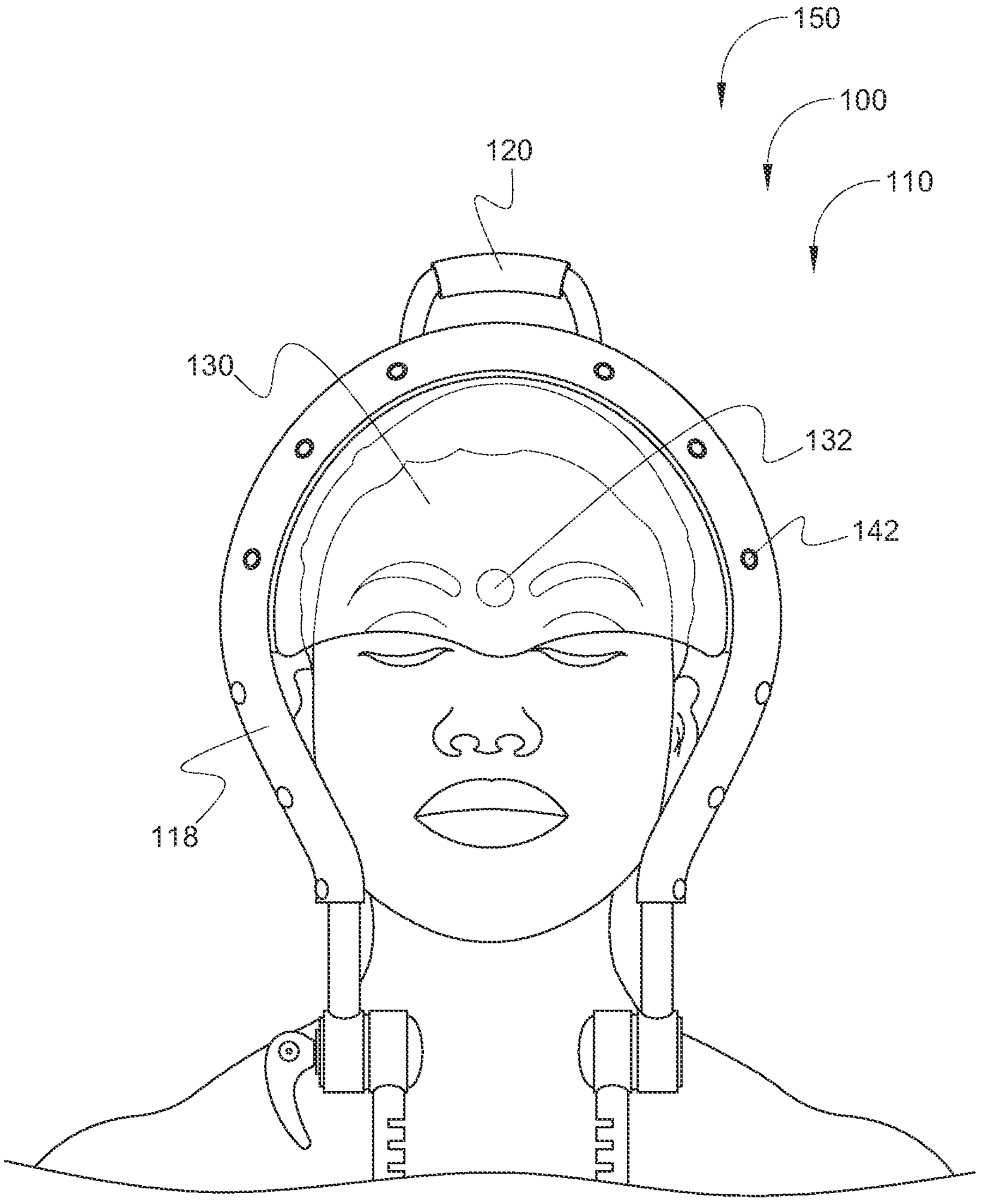
FIG. 2 is a bottom view of the face cradle system during an 'in-use' condition, according to an embodiment of the disclosure.

FIGS. 1-2 show a face cradle system 100 during an 'in-use' condition 150, according to an embodiment of the present disclosure. Here, the face cradle system 100 may be beneficial for use by a user to properly align an upper spine, relieve and prevent sinus pressure while in a prone position, and facilitate a more beneficial massage. As illustrated, the face cradle system 100 may include a face cradle 110 configured to be used in combination with a host massage therapy table 10.

As above, the face cradle system 100 may include the face cradle having an adjustable frame 112 comprising an open-ended oval shape. The adjustable frame 112 includes a first-arm extension 114, a second-arm extension 116, and an oval portion 118. The oval portion 118 of the adjustable frame 112 further comprises a handle 120 and a padded forehead hammock 130 suspended and positioned at a closed end of the oval portion 118. The padded forehead hammock 130 preferably features a sinus relief nodule 132. The oval portion 118, the first-arm extension 114 and the second-arm extension 116 may be connected at an adjustable pivot point 154. The oval portion 118 is configured to pivot in relation to the first-arm extension 114 and the second-arm extension 116.

Figure 3:
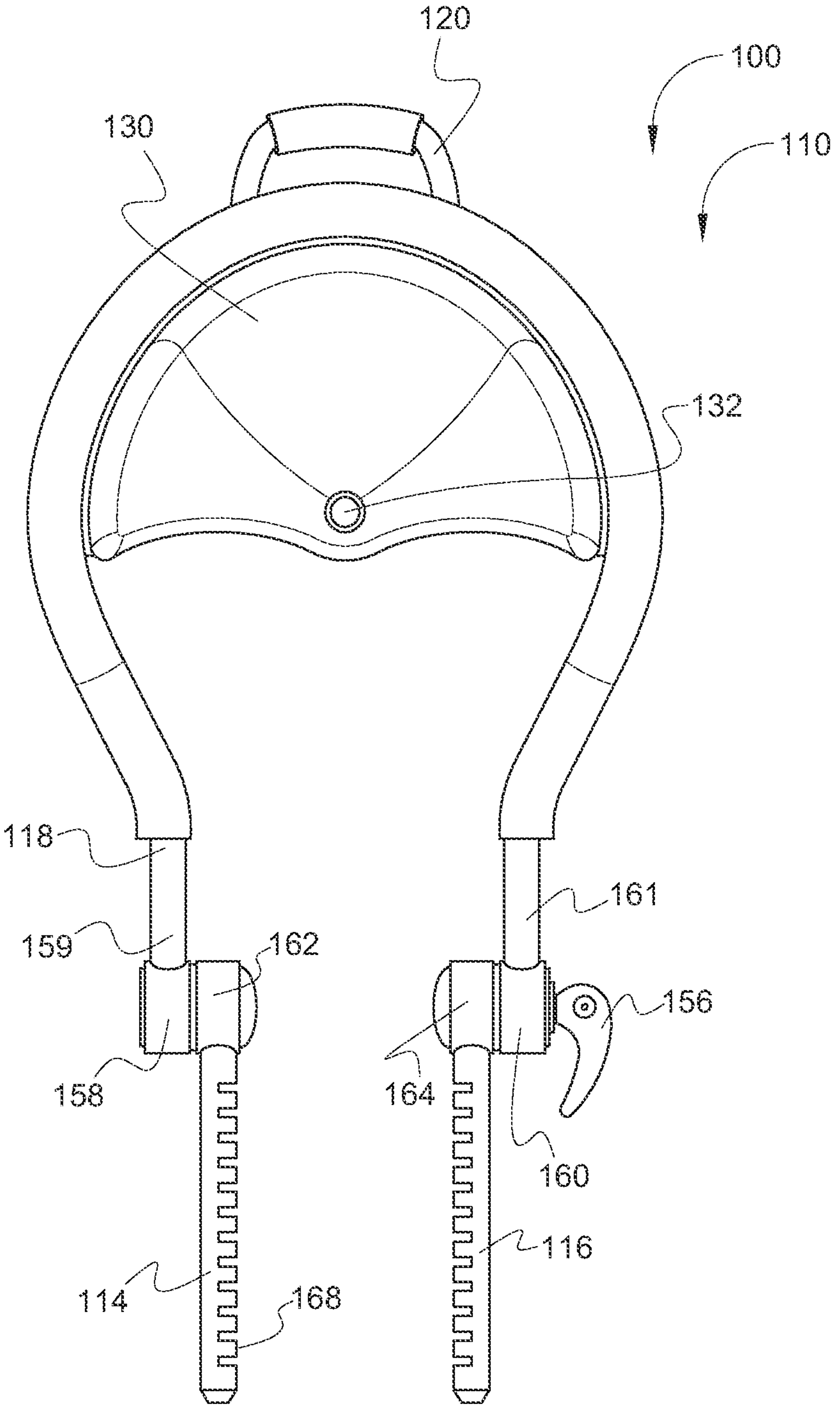
FIG. 3 is a top view of the face cradle system of FIG. 1, according to an embodiment of the present disclosure.

FIG. 3 is a top view of the face cradle system 100 of FIG. 1, according to an embodiment of the present disclosure. As illustrated, the first-arm extension 114 and the second-arm extension 116 each comprise a plurality of indentations 168 and are configured to be inserted into the host massage therapy table 10 and engage with respective receiving-indentions of the host massage therapy table 10. The handle 120 extends from the closed end of the oval portion 118. The first-arm extension 114 and the second-arm extension 116 may comprise an approximate length of eight inches and a width-distance of seven and one-quarter inches to allow for insertion into the host massage therapy table 10. The face cradle system 100 may be made in various sizes and shapes of applicability including multiple sizes for use with individual massage recipients of various ages and sizes.

Figure 4:
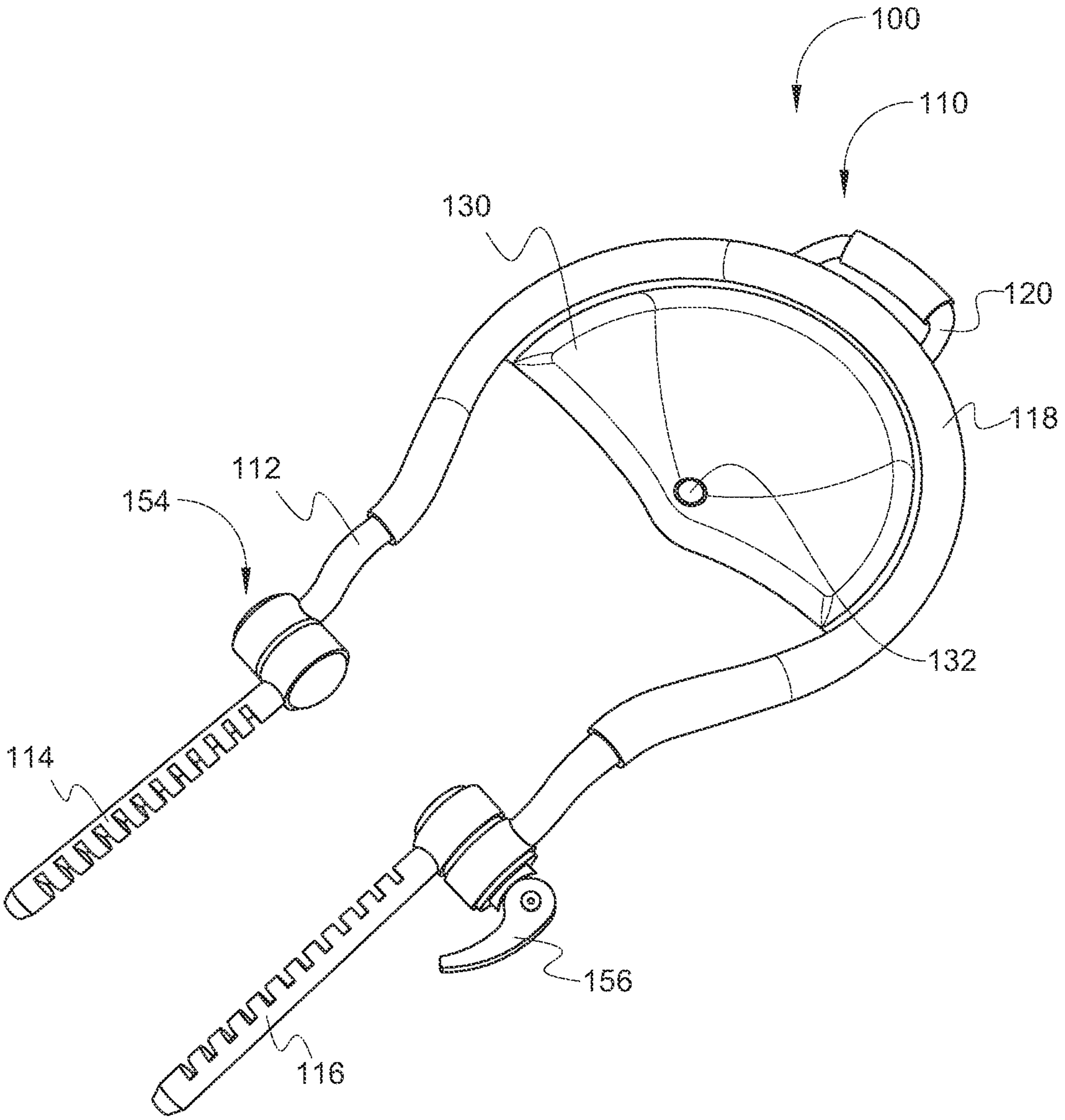
FIG. 4 is a top perspective view of the face cradle system of FIG. 1, according to an embodiment of the present disclosure.
Figure 5:
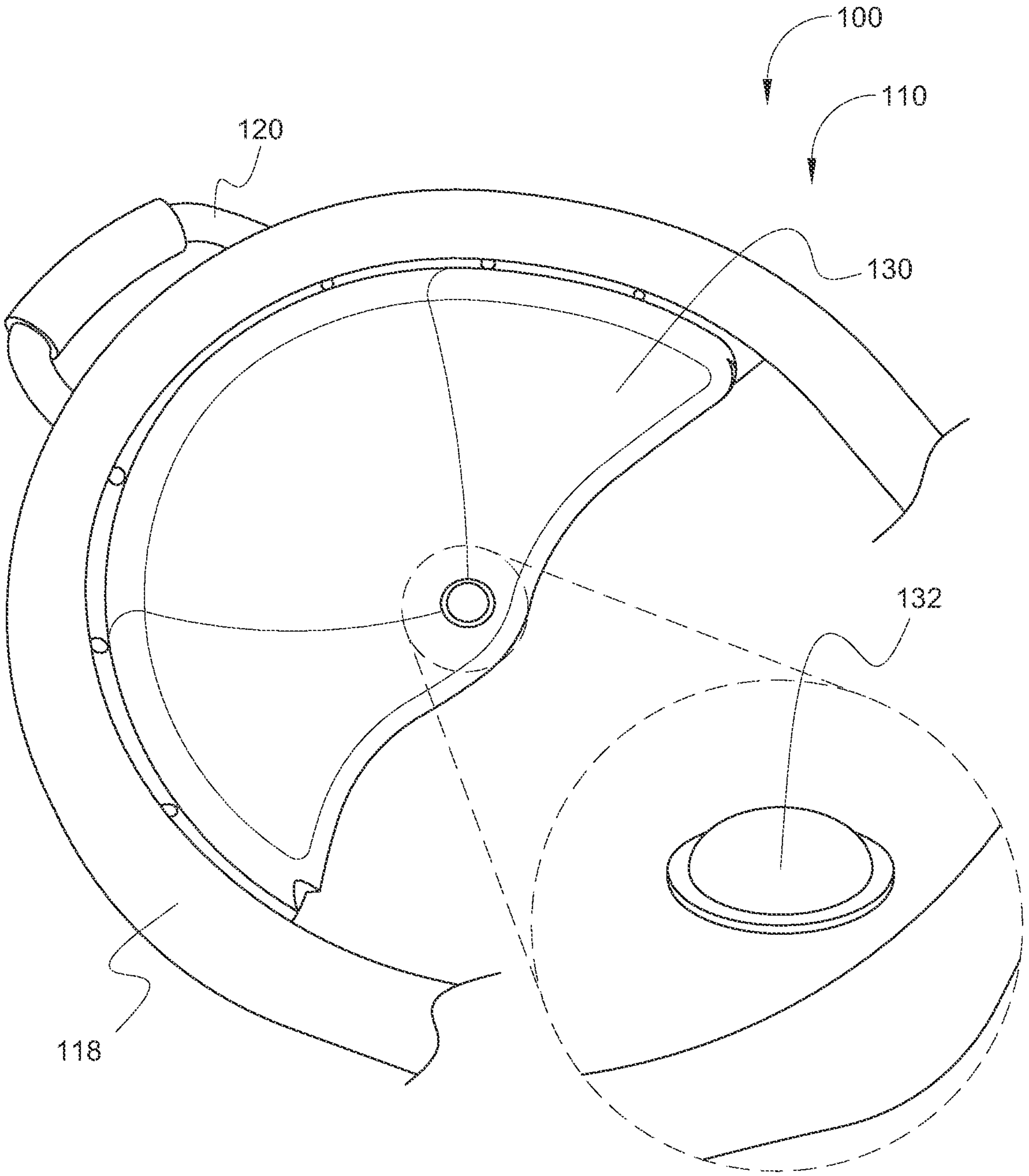
FIG. 5 is a top perspective view of the face cradle system of FIG. 1, according to an embodiment of the present disclosure.

FIGS. 4-5 are views of the face cradle system 100 of FIG. 1, according to an embodiment of the present disclosure. As shown in the figures, the face cradle 110 includes the adjustable frame 112 comprising the first-arm extension 114, the second-arm extension 116, and the oval portion 118. The oval portion 118 of the adjustable frame 112 further comprises the handle 120 and the padded forehead hammock 130. The padded forehead hammock 130 includes a semi-circular shape. The sinus relief nodule 132 is positioned on and extends from a lower width-center of an exterior surface of the padded forehead hammock 130. The sinus relief nodule 132 comprises a hemispherical shape provided for sinus relief during use. The handle 120 extends from the oval portion 118, in forward projection from the closed end of the oval portion 118. The handle 120 may comprise aluminum, and measures approximately five inches in length by five-eighths of an inch in diameter. The handle 120 may feature a lining or handle-gripping material. The face cradle 110 of the face cradle system 100 can be adjusted by the handle 120 that projects forward from the device. The face cradle system 100 may include a slipcover that can be applied over the padded forehead hammock 130 before use, and then may be easily removed for laundering after use.

Figure 6:
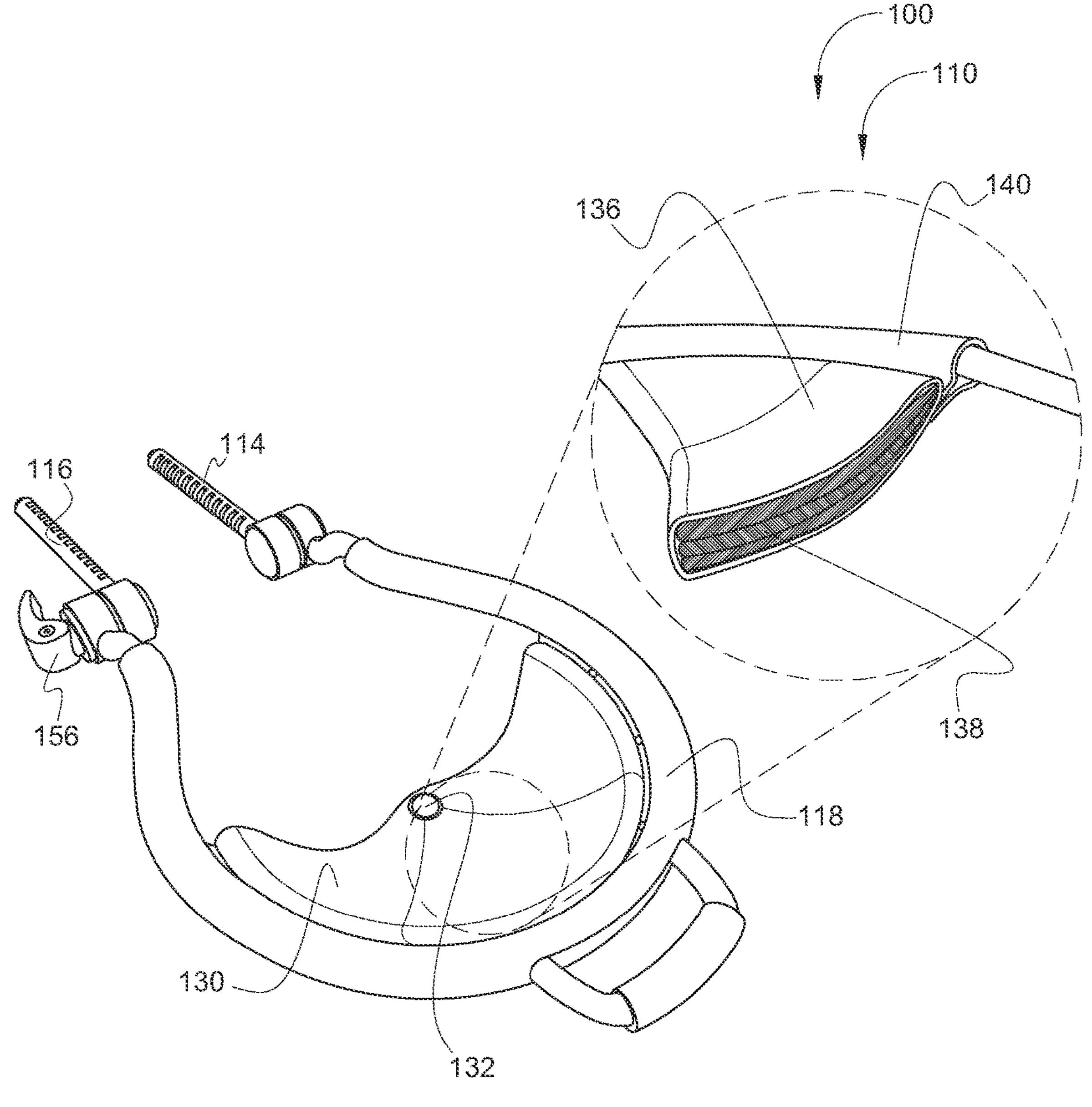
FIG. 6 is a top perspective view of the face cradle system of FIG. 1, according to an embodiment of the present disclosure.

FIG. 6 is a top perspective view of the face cradle system 100 of FIG. 1, according to an embodiment of the present disclosure. The padded forehead hammock 130 comprises a mesh casing 136 housing at least one layer of foam 138. The mesh casing 136 may be made of various materials of waterproof capabilities, such as but not limited to polyurethane. In a preferred embodiment, the mesh casing 136 houses three layers of low-resilience polyurethane foam, each layer comprises a thickness of approximately 0.5 inches. The at least one layer of foam 138 within the padded forehead hammock 130 of the face cradle system 100 may be of various indentation force deflection ratings within the ten-to-sixteen range of intended applicability (IFD 10-16). The padded forehead hammock 130 of the face cradle system 100 does not contact or apply pressure upon the sinus areas on either side of the nose of the user, unlike the pressure applied by traditional face cradle devices.

Figure 7:
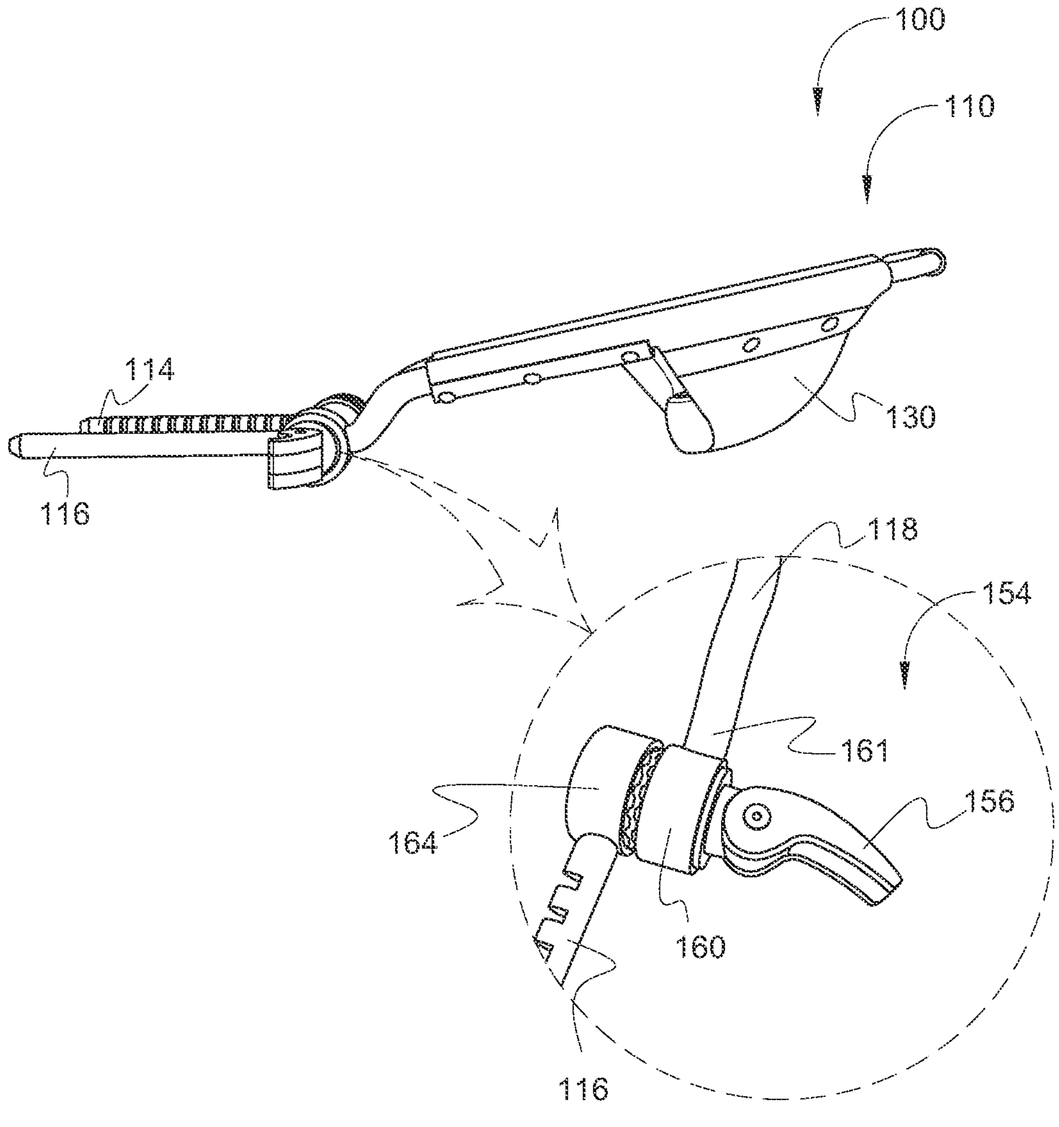
FIG. 7 is a side view of the face cradle system of FIG. 1, according to an embodiment of the present disclosure.

FIG. 7 is a side view of the face cradle system 100 of FIG. 1, according to an embodiment of the present disclosure. The adjustable pivot point 154 comprises a lever 156, a first-member 158, a second-member 160, a first arm-engaging-member 162, and a second arm-engaging-member 164 working in combination to provide an angle adjustable face cradle 110. The lever 156 locks and alternately unlocks the adjustable pivot point 154. The first-member 158 is connected to a first-end 159 of the oval portion 118 and configured to engage with the first arm-engaging-member 162 being positioned at a distal end of the first-arm extension 114. The second-member 160 is connected to a second-end 161 of the oval portion 118 and configured to engage with the second arm-engaging-member 164 being positioned at a distal end of the second-arm extension 116. The first-member 158 and the first arm-engaging-member 162 comprise interlockable teeth and the second-member 160 and the second arm-engaging-member 164 comprise a second set of interlockable teeth configured to disengage and alternatively engage during a locked-condition.

Figure 8:
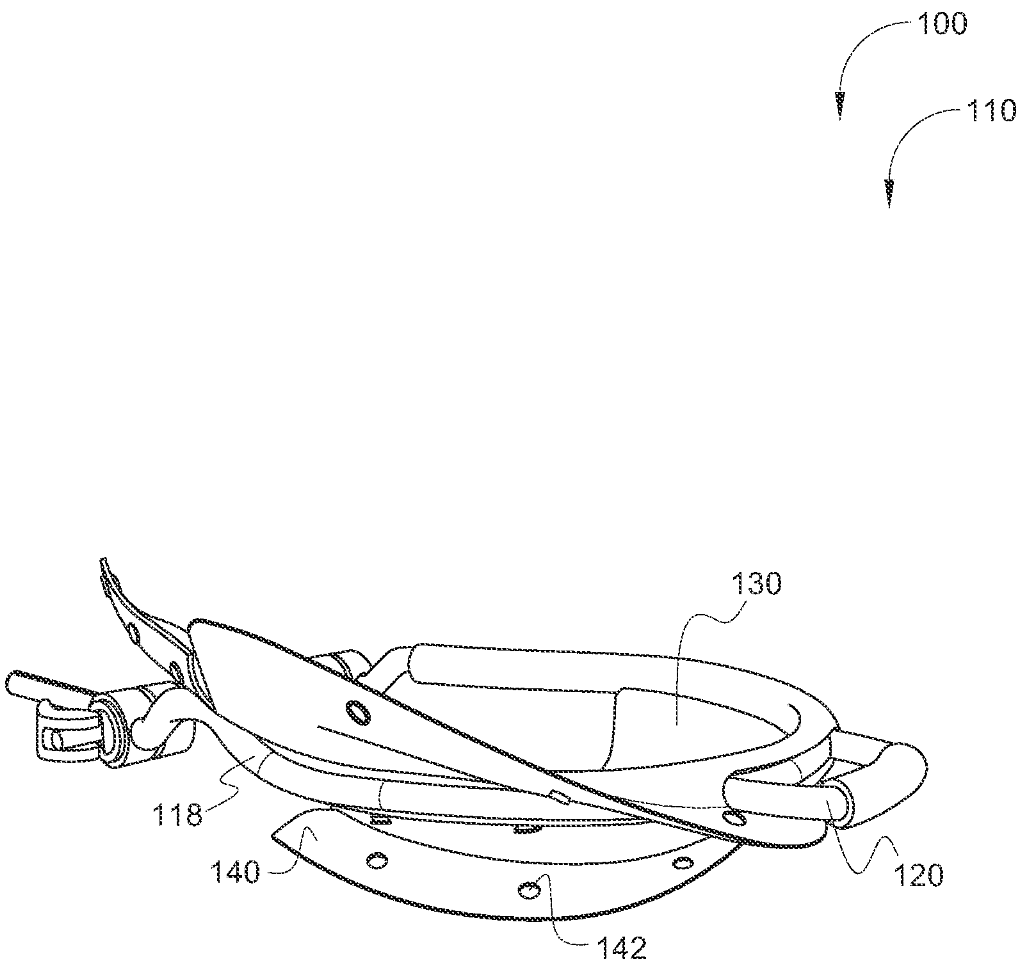
FIG. 8 is a perspective view of the face cradle system of FIG. 1, according to an embodiment of the present disclosure.

FIG. 8 is a perspective view of the face cradle system 100 of FIG. 1, according to an embodiment of the present disclosure. The padded forehead hammock 130 includes padded sections 140 configured to cover side sections of the oval portion 118. The padded forehead hammock 130 may be removable from the oval portion 118. The padded forehead hammock 130 includes releasable fasteners 142 such as a series of snap-fasteners. The padded forehead hammock 130 of the face cradle system 100 may attach to the oval portion 118 by various means, including but not limited to buttons, hook-and-loop material, buckle and strap. In additional embodiments, the padded forehead hammock 130 of the face cradle system 100 may attach to the oval portion 118 by various means, including means that provide resistance such as but not limited to bungee cords.

Figure 9:
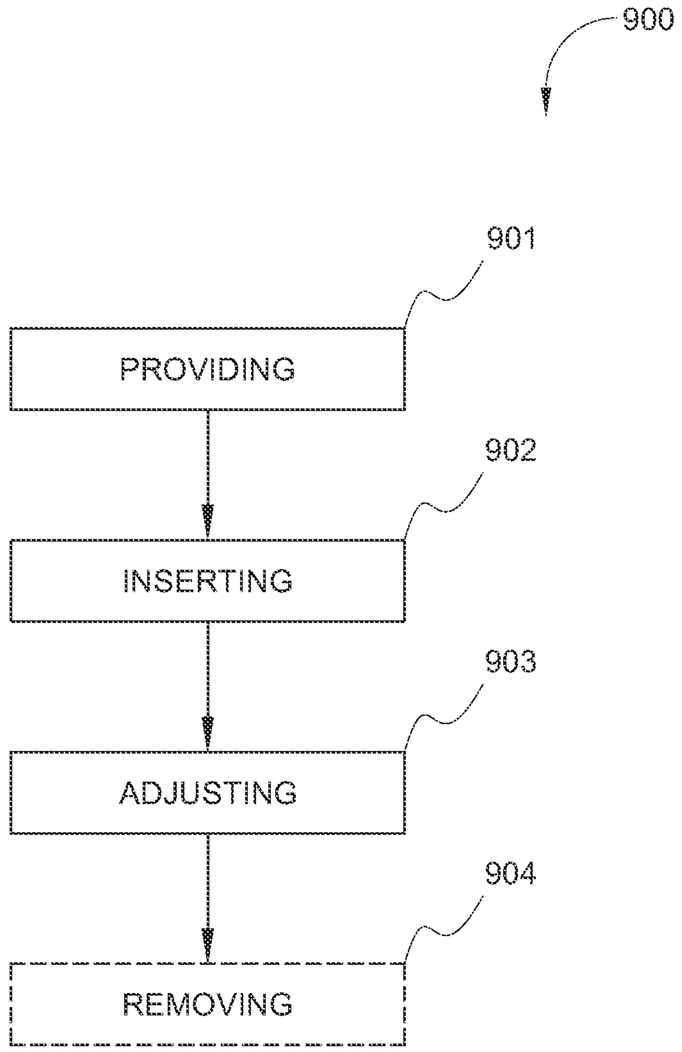
FIG. 9 is a flow diagram illustrating a method for using a face cradle system, according to an embodiment of the present disclosure.

FIG. 9 is a flow diagram illustrating a method 900 for using a face cradle system 100, according to an embodiment of the present disclosure. In particular, the method 900 for using a face cradle system 100 may include one or more components or features of the face cradle system 100 as described above. As illustrated, the method 900 for using a face cradle system 100 may include the steps of: step one 901, providing a face cradle 110 configured to be used in combination with a host massage therapy table 10; step two 902, inserting a first-arm extension 114 and a second-arm extension 116 within the host massage therapy table 10; step three 903, adjusting an angle of the face cradle 110; and step four 904, removing the face cradle 110 from the host massage therapy table 10.

It should be noted that step four 904 is an optional step and may not be implemented in all cases. Optional steps of method of use 900 are illustrated using dotted lines in FIG. 9 so as to distinguish them from the other steps of method of use 900. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for using a face cradle system, are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A face cradle system, the face cradle system comprising:
- a face cradle configured to be used in combination with a host massage therapy table, said face cradle including,
  - an adjustable frame comprising an open-ended oval shape, said adjustable frame including,
    - a first-arm extension,
    - a second-arm extension, and
    - an oval portion including,
    - a handle, and
    - a padded forehead hammock positioned at a closed end of said oval portion having,
      - a sinus relief nodule, and
- wherein said oval portion, said first-arm extension and said second-arm extension are connected at an adjustable pivot point, said oval portion is configured to pivot in relation to said first-arm extension and said second-arm extension;
- wherein said padded forehead hammock includes a semi-circular shape;

wherein said padded forehead hammock comprises a mesh casing housing three layers of low-resilience polyurethane foam, each layer comprises a thickness of approximately 0.5 inches.

2. The face cradle system of claim 1, wherein said first-arm extension and said second-arm extension each comprise a plurality of indentations and are configured to be inserted into said host massage therapy table and engage with respective receiving-indentions of said host massage therapy table.

3. The face cradle system of claim 1, wherein said adjustable pivot point comprises:

a lever;
a first-member;
a second-member;
a first arm-engaging-member; and
a second arm-engaging-member working in combination to provide an angle adjustable said face cradle.

4. The face cradle system of claim 3, wherein said first-member is connected to a first-end of said oval portion and configured to engage with said first arm-engaging-member being positioned at a distal end of said first-arm extension.

5. The face cradle system of claim 4, wherein said second-member is connected to a second-end of said oval portion and configured to engage with said second arm-engaging-member being positioned at a distal end of said second-arm extension.

6. The face cradle system of claim 5, wherein said first-member and said first arm-engaging-member comprise interlockable teeth and said second-member and said second arm-engaging-member comprise a second set of interlockable teeth configured to disengage and alternatively engage during a locked-condition.

7. The face cradle system of claim 3, wherein said lever locks and alternately unlocks said adjustable pivot point.

8. The face cradle system of claim 1, wherein said padded forehead hammock includes padded sections configured to cover side sections of said oval portion.

9. The face cradle system of claim 8, wherein said padded forehead hammock is removable from said oval portion.

10. The face cradle system of claim 9, wherein said padded forehead hammock includes releasable fasteners.

11. A face cradle system, the face cradle system comprising:

a face cradle configured to be used in combination with a host massage therapy table, said face cradle including,
an adjustable frame comprising an open-ended oval shape, said adjustable frame including,
a first-arm extension,
a second-arm extension, and
an oval portion including,
a handle, and
a padded forehead hammock positioned at a closed end of said oval portion having,
a sinus relief nodule, and
wherein said oval portion, said first-arm extension and said second-arm extension are connected at an adjustable pivot point, said oval portion is configured to pivot in relation to said first-arm extension and said second-arm extension
wherein said padded forehead hammock includes a semi-circular shape
wherein said padded forehead hammock comprises a mesh casing housing at least one layer of foam;
wherein said padded forehead hammock includes padded sections configured to cover side sections of said oval portion;
wherein said padded forehead hammock is removable from said oval portion;
wherein said padded forehead hammock includes releasable fasteners; and
wherein said releasable fasteners include a series of snap-fasteners.

12. The face cradle system of claim 1, wherein said sinus relief nodule is positioned on and extends from a lower width-center of an exterior surface of said padded forehead hammock.

13. A face cradle system, the face cradle system comprising:

a face cradle configured to be used in combination with a host massage therapy table, said face cradle including,
an adjustable frame comprising an open-ended oval shape, said adjustable frame including,
a first-arm extension,
a second-arm extension, and
an oval portion including,
a handle, and
a padded forehead hammock positioned at a closed end of said oval portion having,
a sinus relief nodule, and
wherein said oval portion, said first-arm extension and said second-arm extension are connected at an adjustable pivot point, said oval portion is configured to pivot in relation to said first-arm extension and said second-arm extension;
wherein said sinus relief nodule is positioned on and extends from a lower width-center of an exterior surface of said padded forehead hammock; and
wherein said sinus relief nodule comprises a hemispherical shape.

14. The face cradle system of claim 1, wherein said handle extends from said closed end of said oval portion.

15. A face cradle system, the face cradle system comprising:

a face cradle configured to be used in combination with a host massage therapy table, said face cradle including,
an adjustable frame comprising an open-ended oval shape, said adjustable frame including,
a first-arm extension,
a second-arm extension, and
an oval portion including,
a handle, and
a padded forehead hammock positioned at a closed end of said oval portion having,
a sinus relief nodule, and
wherein said oval portion, said first-arm extension and said second-arm extension are connected at an adjustable pivot point, said oval portion is configured to pivot in relation to said first-arm extension and said second-arm extension;
wherein said first-arm extension and said second-arm extension each comprise a plurality of indentations and are configured to be inserted into said host massage therapy table and engage with respective receiving-indentions of said host massage therapy table;
wherein said adjustable pivot point comprises a lever, a first-member, a second-member, a first arm-engaging-member, and a second arm-engaging-member working in combination to provide an angle adjustable said face cradle;

wherein said first-member is connected to a first-end of said oval portion and configured to engage with said first arm-engaging-member being positioned at a distal end of said first-arm extension;

wherein said second-member is connected to a second-end of said oval portion and configured to engage with said second arm-engaging-member being positioned at a distal end of said second-arm extension;

wherein said first-member and said first arm-engaging-member comprise interlockable teeth and said second-member and said second arm-engaging-member comprise a second set of interlockable teeth configured to disengage and alternatively engage during a locked-condition;

wherein said lever locks and alternately unlocks said adjustable pivot point;

wherein said padded forehead hammock includes a semi-circular shape;

wherein said padded forehead hammock comprises a mesh casing housing at least one layer of foam;

wherein said mesh casing houses three layers of low-resilience polyurethane foam, each layer comprises a thickness of approximately 0.5 inches;

wherein said padded forehead hammock includes padded sections configured to cover side sections of said oval portion;

wherein said padded forehead hammock is removable from said oval portion;

wherein said padded forehead hammock includes releasable fasteners;

wherein said releasable fasteners include a series of snap-fasteners;

wherein said sinus relief nodule is positioned on and extends from a lower width center of an exterior surface of said padded forehead hammock;

wherein said sinus relief nodule comprises a hemispherical shape; and wherein said handle extends from said closed end of said oval portion.

* * * * *